United States Patent [19]

Ishigaki et al.

[11] Patent Number: 4,614,910
[45] Date of Patent: Sep. 30, 1986

[54] QUARTERNARY DIFFERENTIAL PSK DEMODULATOR

[75] Inventors: Yukinobu Ishigaki, Tokyo; Kazutoshi Hirohashi, Yokohama, both of Japan

[73] Assignee: Victor Company of Japan, Ltd., Yokohama, Japan

[21] Appl. No.: 757,847

[22] Filed: Jul. 22, 1985

Related U.S. Application Data

[63] Continuation-in-part of Ser. No. 710,211, Mar. 11, 1985, abandoned.

[30] Foreign Application Priority Data

Mar. 12, 1984 [JP] Japan ................................. 59-46880
Mar. 19, 1984 [JP] Japan ................................. 59-52744
Jul. 24, 1984 [JP] Japan ................................. 59-153562

[51] Int. Cl.$^4$ ............................................. H04L 27/22
[52] U.S. Cl. ...................................... 329/50; 329/124; 375/81; 375/83; 375/120; 370/58; 370/100
[58] Field of Search .................... 329/50, 122, 124; 375/81, 82, 88, 94, 120; 370/58, 100

[56] References Cited

U.S. PATENT DOCUMENTS

| | | | |
|---|---|---|---|
| 3,993,956 | 11/1976 | Gilmore et al. | 375/84 |
| 4,085,378 | 4/1978 | Ryan et al. | 329/124 |
| 4,100,499 | 7/1978 | Monrolin | 329/50 |
| 4,344,178 | 8/1982 | Waters | 375/81 |

Primary Examiner—Siegfried H. Grimm
Attorney, Agent, or Firm—Cushman, Darby & Cushman

[57] ABSTRACT

In a quarternary differential PSK demodulator, a QPSK input signal is applied to first and second synchronous detectors to which carriers with a 90-degree phase difference therebetween are respectively applied from a voltage-controlled oscillator. A first double-balanced phase detector multiplies the outputs from the synchronous detectors. A second phase detector squares the output of the second synchronous detector. A third double-balanced phase detector provides multiplication of the outputs of the first and second double-balanced phase detectors to generate an output having four times the frequency of the outputs of the synchronous detectors to cancel the information carried by the input PSK signal. A loop filter converts the output of the third phase detector to a DC phase control signal to be applied to the voltage-controlled oscillator.

12 Claims, 6 Drawing Figures

QUARTERNARY DIFFERENTIAL PSK DEMODULATOR

CROSS-REFERENCE TO COPENDING APPLICATION

This application is a continuation-in-part application of U.S. patent application Ser. No. 710,211, filed Mar. 11, 1985 and now abandoned.

BACKGROUND OF THE INVENTION

The present invention relates to a quarternary phase shift keying demodulator.

Because of the large information carrying capability of PSK modulation a compared with frequency modulation for a given period of time over a predetermined bandwidth, PSK modulation techniques have been extensively used in recent years for transmitting digitized audio signals over broadcast satellite links and other transmission facilities.

For demodulating a quarternary PSK modulated signal in which the carrier is suppressed, a local carrier must be regenerated in precise phase relation with the original carrier to permit synchronous detection.

Over the past years, PSK demodulators have been designed on techniques which deal with signals in the carrier frequency band. These techniques include frequency multiplication, remodulation and inverse modulation. Another type of PSK modulation circuit is based on techniques which deal with signals in the baseband frequency such as the Costas loop system and the modified Costas loop system. Cost reduction in multiplier circuits as a result of recent advances in integrated circuits have prompted the use of analog multipliers in greater numbers, with the result that the Costas loop system and the modified Costas loop system have become dominant in the design of PSK demodulator circuitry.

Since the PSK demodulator of the Costas loop system or its modified version basically operates in a phase locked loop, it is important that the elements of the phase locked loop must exhibit excellent stability. However, analog multipliers have met with difficulty in operating at a frequencies higher than 1 Megaherz.

SUMMARY OF THE INVENTION

Accordingly, an object of the present invention is to provide a quarternary differential PSK demodulator capable of operating at frequencies higher than 1 Megaherz.

A quarternary differential PSK demodulator of the invention includes an input terminal, a pair of output terminals, first and second synchronous detectors each having first and second input terminals and an output terminal, the first input terminals of the synchronous detectors being connected together to the input terminal of the demodulator and the output terminals of the detectors being respectively coupled to the output terminals of the demodulator, a 90-degree phase shifter, a variable frequency oscillator for providing a carrier to the second input terminal of the first synchronous detector and to the second input terminal of the second synchronous detector through the 90-degree phase shifter, and a loop filter for providing a phase control signal to the oscillator.

According to the present invention, the demodulator comprises a first double-balanced phase detector responsive to the outputs of said first and second synchronous detectors for generating a first phase detector output, a second double-balanced phase detector responsive to the output of said second synchronous detector for generating a second phase detector output, and a third double-balanced phase detector responsive to said first and second phase detector outputs for generating a third phase detector output and applying the third phase detector output to said loop filter.

According to a second aspect of the present invention, the demodulator comprises a first double-balanced phase detector for generating a first phase detector output representative of a product of the signals from the first and second synchronous detectors. A second double-balanced phase detector is provided having a first input terminal responsive to a signal having a polarity opposite to the signal from the second synchronous detector and a second input terminal responsive to the signal from the first synchronous detector to provide a second phase detector output which is representative of a product of the signals supplied to the input terminals of the second double-balanced phase detector. A third double-balanced phase detector is provided for generating a third phase detector output representative of a square of the signal from the second synchronous detector, and a fourth double-balanced phase detector generates a fourth phase detector output representative of a square of the signal from the first synchronous detector. A first subtractor generates a first subtractor output representative of a difference in magnitude between the first and second phase detector outputs and a second subtractor generates a second subtractor output representative of a difference in magnitude between the third and fourth phase detector outputs. The first and second subtractor outputs are combined in a circuit which supplies to the loop filter a signal having a frequency four times higher than the frequency of the signals generated by the first and second synchronous detectors. The PSK demodulator according to the second aspect of the invention is free from temperature-dependent DC drift problem which affects the stability of the phase-locked loop.

According to a third aspect of the invention, the demodulator is adapted to receive a time-division multiplexed signal in which at least one quarternary differential PSK signal is multiplexed in burst form with another signal whether it be a PSK or other forms of signal. The demodulator includes means for separating the PSK bursts and deriving a sampling pulse from each of the separated PSK bursts. The loop filter of the demodulator comprises a resistor and a capacitor coupled through a switch to the resistor, the switch being responsive to the sampling pulse to complete the RC network to store the signal applied to the loop filter. The capacitor is disconnected from the resistor during the interval between successive PSK bursts to allow it to hold the stored voltage during that interval to maintain the application of the output of the loop filter to the variable frequency oscillator until the next PSK burst occurs.

BRIEF DESCRIPTION OF THE DRAWINGS

The present invention will be described in further detail with reference to the accompanying drawings, in which.

DETAILED DESCRIPTION

Figure 1:
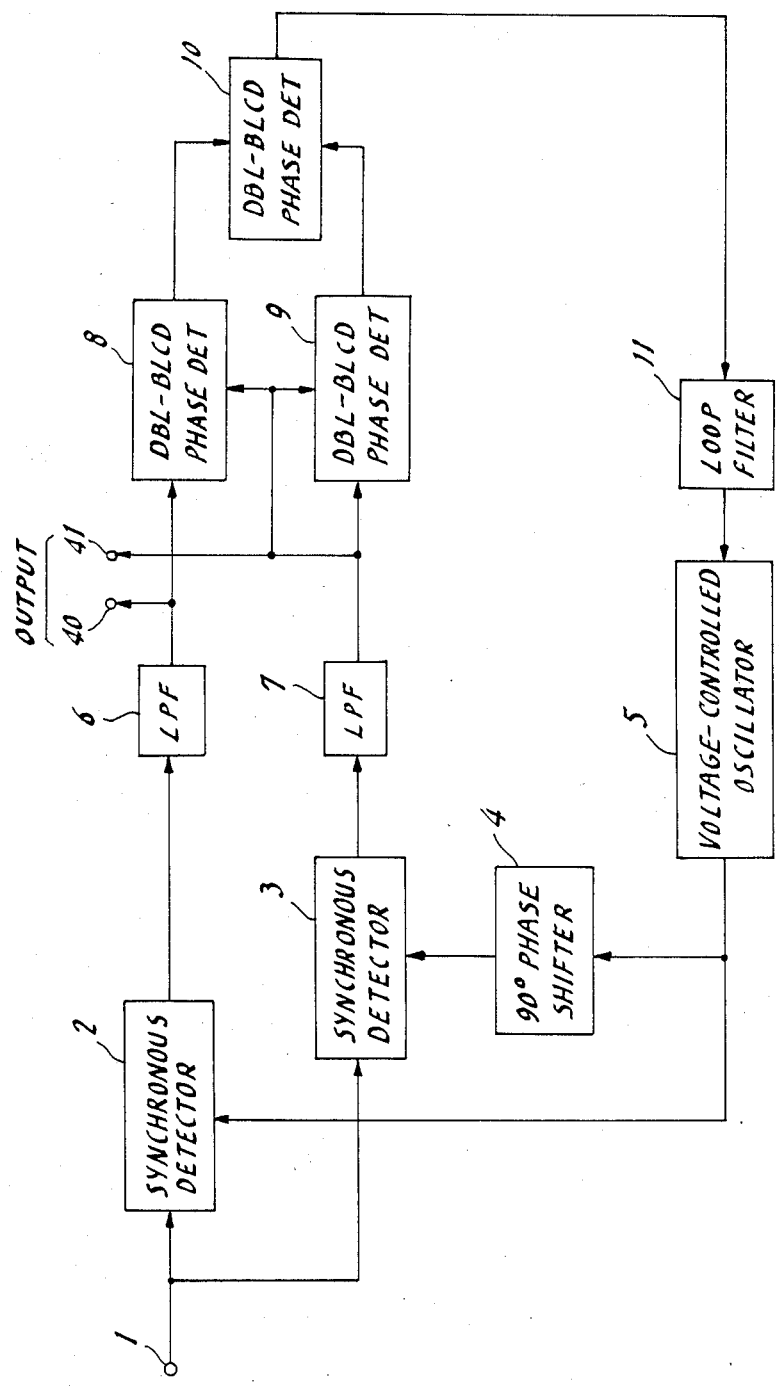
FIG. 1 is a block diagram of an embodiment of the present invention.

Referring now to FIG. 1, a quarternary differential PSK signal is applied through an input terminal 1 to the first inputs of synchronous detectors 2 and 3. A carrier is generated by a voltage-controlled oscillator 5 and applied to the second input of synchronous detector 2 and via a 90-degree phase shifter 4 to the second input of synchronous detector 3. The outputs of synchronous detectors 2 and 3 are passed through low-pass filters 6 and 7, respectively, to remove the carrier components which remain after the synchronous detection. The outputs of low-pass filters 6 and 7 are multiplied by a double-balanced phase detector 8 and fed to one input of a double-balanced phase detector 10. The output of low-pass filter 7 is squared by a double-balanced phase detector 9 and fed to the second input of double-balanced phase detector 10, the output of which is converted to a DC phase control signal by a loop filter 11 and fed to voltage-controlled oscillator 5. The output signals of the demodulator are withdrawn from terminals 40 and 41 coupled to the outputs of low-pass filters 6 and 7.

The input signal at terminal 1 is represented by A2 cos $(\omega t + \phi)$ and the carrier from oscillator 5 by A1 cos $\omega t$ (where $\phi$ represents each of the phase values of the QDPSK input signal, that is 0, $\pi/2$, $\pi$, $3\pi/2$). Then, the output of low-pass filter 6 is given by $(A1 \cdot A2 \cos \phi)/2$ and the output of low-pass filter 7 is expressed by $(A1 \cdot A2 \sin \phi)/2$.

The double-balanced phase detector 8 provides multiplication operation on the signal $(A1 \cdot A2 \cos \phi)/2$ from low-pass filer 6 and the signal $(A1 \cdot A2 \sin \phi)/2$ from low-pass filter 7 and provides a product signal having a phase sin $2\phi$ to the double-balanced phase detector 10. The double-balanced phase detector 9 provides a squaring operation on the signal $(A1 \cdot A2 \sin \phi)/2$ from filter 7 so that it provides a product having a phase $-\cos 2\phi$ to the double-balanced phase detector 10.

The input signals sin $2\phi$ and $-\cos 2\phi$ to the double-balanced phase detector 10 are multiplied to derive an output signal $-\sin 4\phi$.

Because of the quadrupled phase, the original phase information or modulating signal component is canceled in the phase detector 10. Phase error components synchronously detected by synchronous detectors 2 and 3 are thus derived from loop filter 11. Carriers supplied to synchronous detectors 2 and 3 are thus maintained in a definite phase relation with the original carrier. The double-balanced phase detectors operate successfully at frequencies higher than 1 Megaherz.

Figure 2:
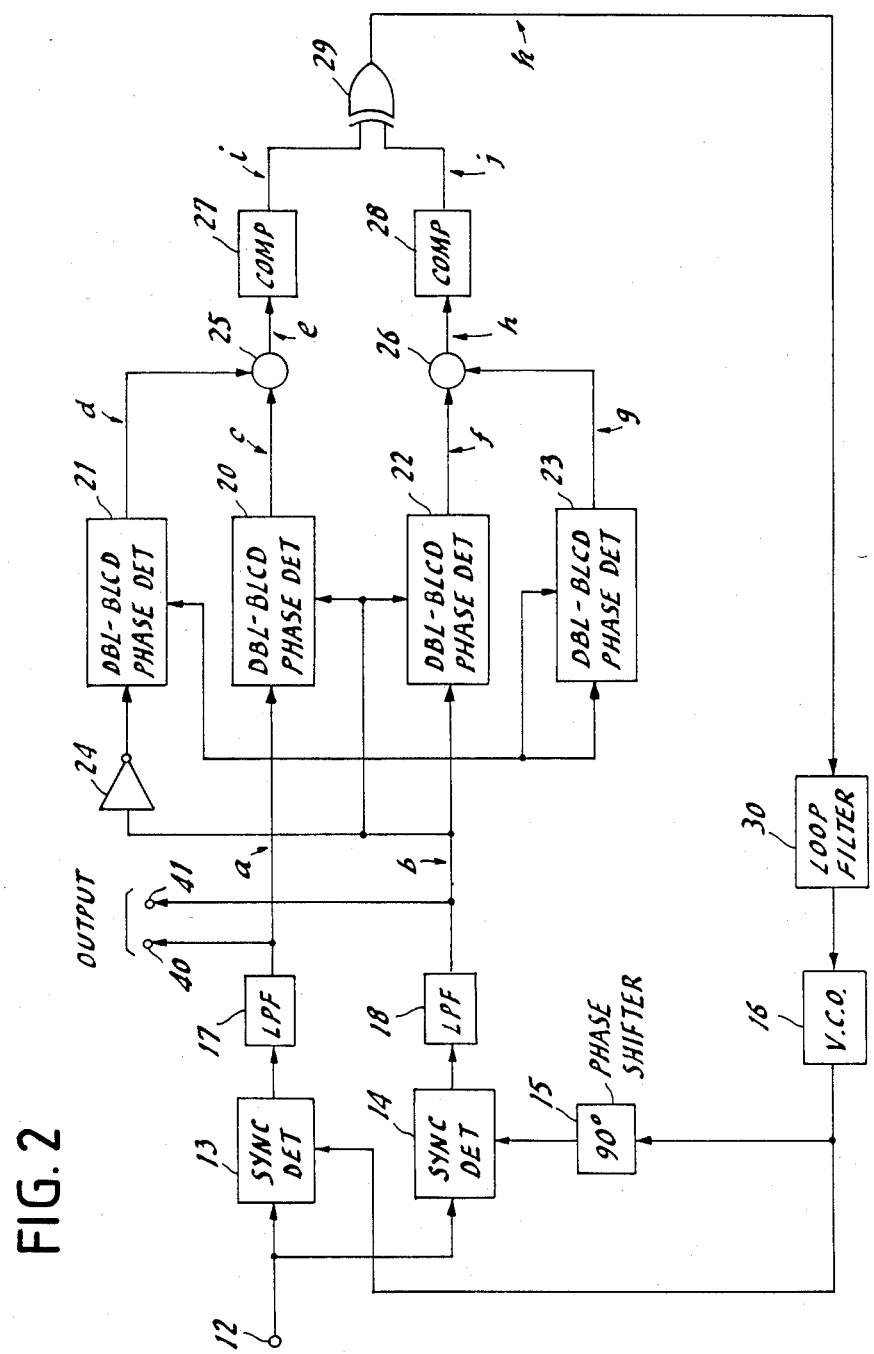
FIG. 2 is a block diagram of a preferred embodiment of the invention.

A preferred embodiment of the invention is shown in FIG. 2. A carrier-suppressed QDPSK signal received at terminal 12 is applied to synchronous detectors 13 and 14. A second input signal to synchronous detector 13 is supplied from a voltage-controlled oscillator 16 and a second input to synchronous detector 14 is supplied from oscillator 16 via a 90-degree phase shifter 15. After synchronous detection, the outputs of synchronous detectors 13 and 14 are fed to carrier-rejection low-pass filters 17 and 18, respectively, to derive signals shown at a and b in FIG. 3.

Figure 3:
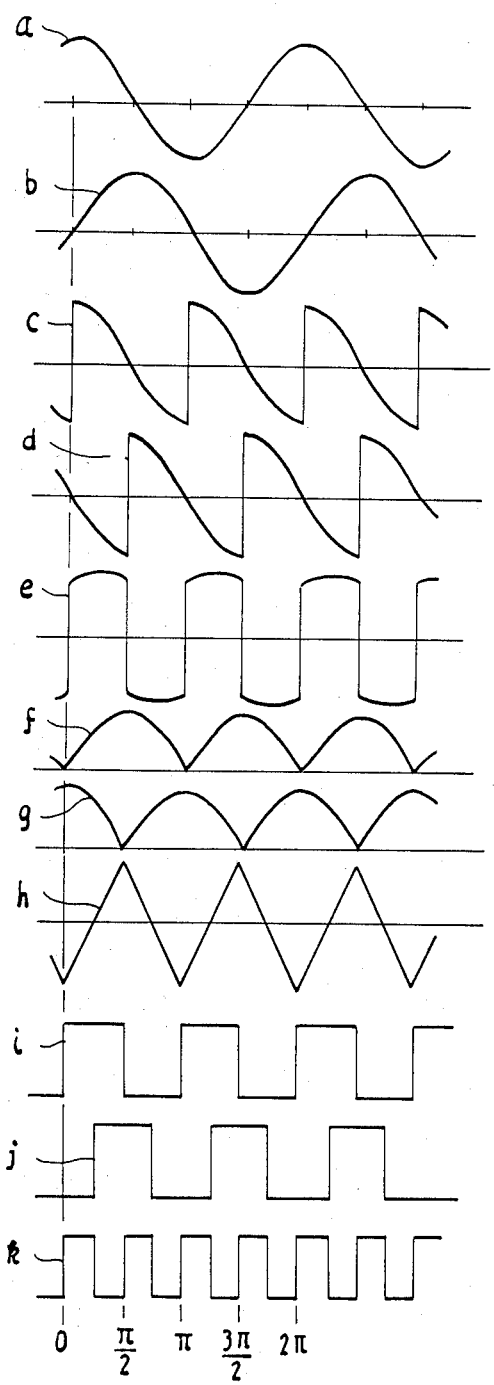
FIG. 3 is a waveform diagram associated with the FIG. 2 embodiment.

The outputs of filters 17 and 18 are coupled to the input terminals of a double-balanced phase detector 20 to generate an output signal shown at c, FIG. 3, which is representative of the product of the instantaneous values of the filter outputs.

The output of filter 18 is coupled via inverter 24 to one input of a double-balanced phase detector 21 which receives a second input from the filter 17 to derive an output signal d, FIG. 3.

The output of low-pass filter 18 is applied to input terminals of a double-balanced phase detector 22 to square the instantaneous value of the input signal to derive a signal f, FIG. 3.

Similarly, the output of filter 17 is squared by a double-balanced phase detector 23 to derive an output signal g, FIG. 3.

The waveform d is subtracted from the waveform c in a subtractor 25. The result is a generation of substantially rectangular pulses e which are fed to a comparator 27 to provide sharply defined rectangular pulses i having a repetition frequency twice the frequency of the outputs of low-pass filters 17, 18. Likewise, the waveform g is subtracted from the waveform f by a subtractor 26 to develop substantially triangular pulses h which are fed to a comparator 28 to generate rectangular pulses j having a repetition frequency twice the frequency of the outputs of low-pass filters 17, 18 with a phase difference of 90 degrees with respect to the output of comparator 27.

The outputs of comparators 27 and 28 are supplied to an Exclusive-OR gate 29. The waveform shown at k represents the output of Exclusive-OR gate 29 which varies at a frequency four times higher than the frequencies of the outputs of low-pass filters 17, 18. Since the input QDPSK signal is at one of four phase values 0, $\pi/2$, $\pi$, $3\pi/2$ radians, these phase values are converted by Exclusive-OR gate 29 to 0, $2\pi$, $4\pi$ and $6\pi$ radians, respectively, thereby canceling the original modulating signal. The output of Exclusive-OR gate 29 thus exclusively contains a component representative of the phase errors detected by the synchronous detectors 13 and 14.

The output of Exclusive-OR gate 29 is filtered by a loop filter 30 to extract the phase error component from the output of Exclusive-OR gate 29 and develop a DC phase control signal having a magnitude and polarity determined by the magnitude and direction, respectively, of the phase difference between the original carrier and the local carrier from oscillator 16. The phase control signal is applied to voltage-controlled oscillator 16 to maintain a definite phase relation between the two carriers.

Because of the double-balanced structure, each of the output waveforms of phase detectors 20 to 23 is symmetrical with respect to zero voltage level. A further feature of the invention lies in the fact that undesirable DC drifts which occur with a temperature variation in phase detectors 20 and 21 are canceled by subtractor 25 and those in phase detectors 22 and 23 are cancelled by subtractor 26. The elimination of DC drifts allows the PSK demodulator to be implemented in integrated circuits.

Terminals 40 and 41 are respectively coupled to the outputs of low-pass filters 17 and 18 to extract demodulator output signals. Quarternary differential outputs will be derived from the demodulator outputs in a circuit, not shown, by taking the difference between preceding and succeeding phase components. The differential outputs will then be translated into (0, 0), (0, 1), (1, 1) and (1, 0) which are interpreted as 0, $\pi/2$, $\pi$ and $3\pi/2$ radians, respectively.

Figure 5:
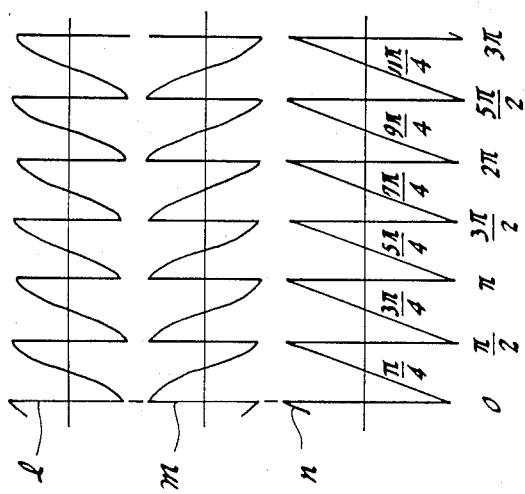
FIG. 5 is a waveform diagram associated with the modified embodiment.
Figure 4:
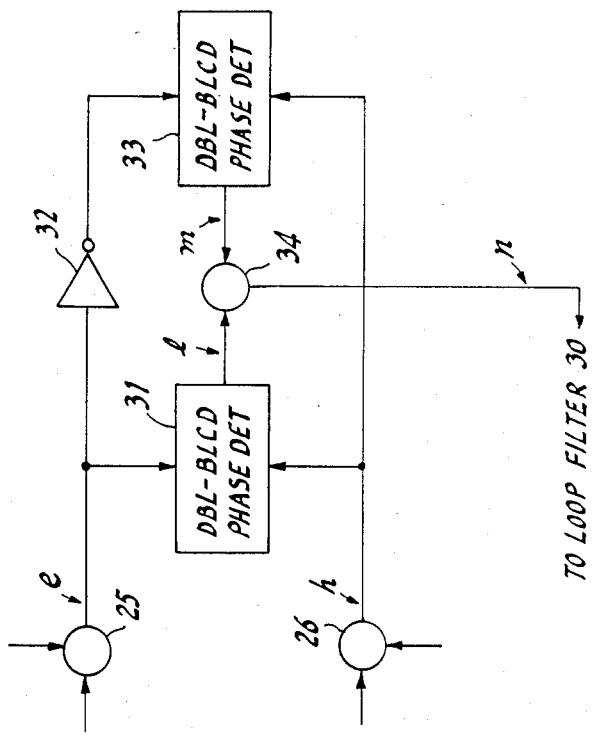
FIG. 4 is a block diagram of a modified embodiment of the invention.

FIG. 4 is a modified embodiment of the invention in which parts corresponding to those in FIG. 2 are marked by the same numerals as used in FIG. 2. In this embodiment, the output signal e of subtractor 25 is supplied to one input of a double-balanced phase detector 31 and through an inverter 32 to one input of a double-balanced phase detector 33, and the output signal h of subtractor 26 is supplied to the other inputs of double-balanced phase detectors 31 and 33. Therefore, the waveforms e and h are multiplied with each other by phase detector 31 to derive a sawtooth wave that is a train of pulses with a nonlinearly varying amplitude as shown at l in FIG. 5 and the inverted waveform e and waveform h are multiplied with each other to derive a sawtooth wave m that is a train of pulses having amplitudes nonlinearly varying in a direction opposite to the waveform l. It is seen that these nonlinear sawtooth waves vary at a frequency four times higher than the outputs a and b of low-pass filters 17 and 18. The sawtooth wave m is subtracted from the sawtooth wave l in a subtractor 34 to produce sawtooth wave pulses n which are applied to loop filter 30. The sawtooth wave pulses n have a linearly varying amplitude having twice the amplitude of waveform l.

Figure 6:
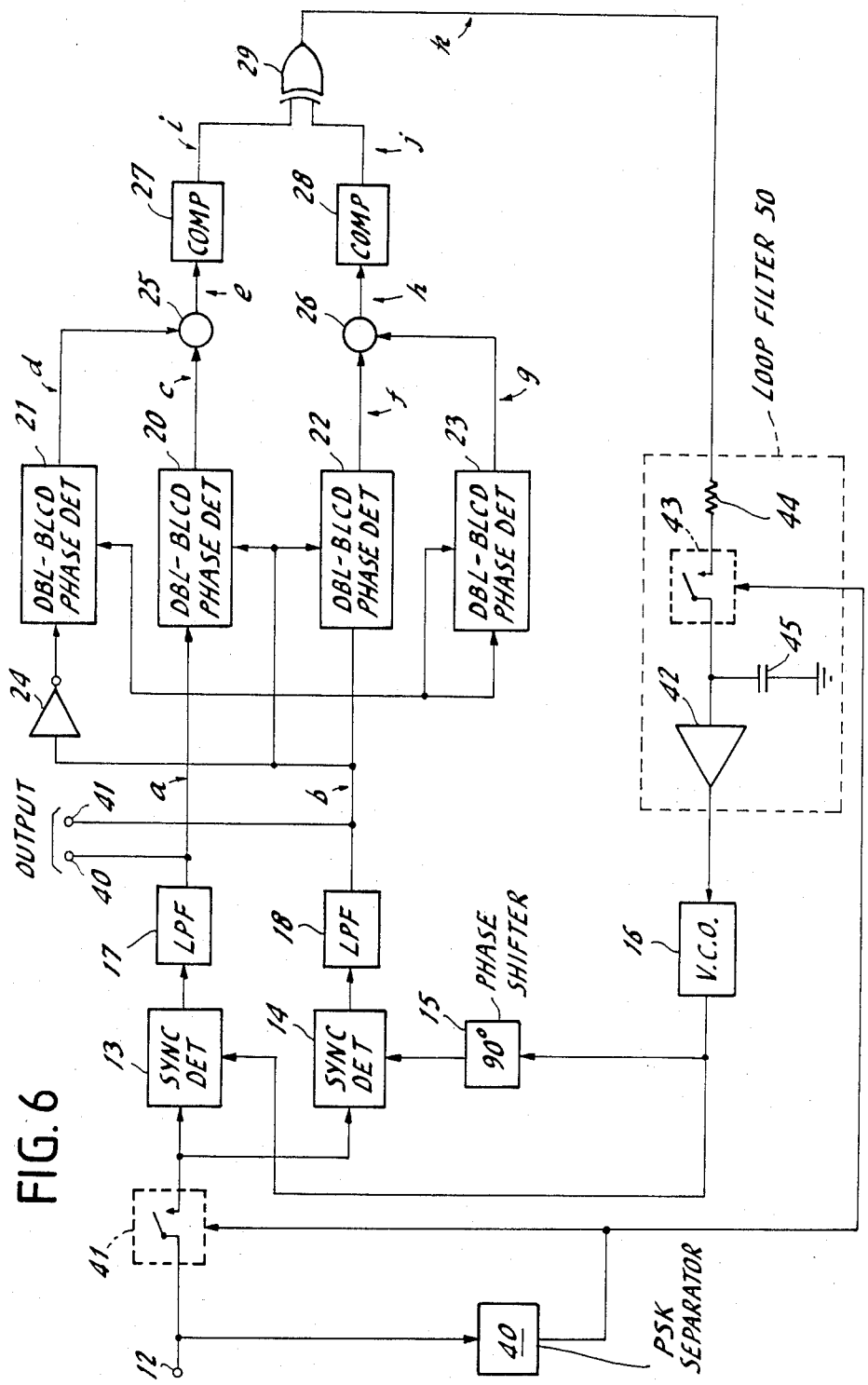
FIG. 6 is a block diagram of a further embodiment of the invention.

FIG. 6 is an illustration of a further embodiment of the invention which is useful for such applications where quarternary DPSK signals of different channels are time-division multiplexed or a quarternary DPSK signal is multiplexed with a frequency- or amplitude-modulated video signal such that it occurs in burst-like form during the vertical blanking interval. On reception, the QDPSK signal must be separated from another signal, i.e., the video signal to derive a series of QDPSK bursts spaced at vertical trace intervals.

The demodulator shown in FIG. 6 is a modification of the FIG. 2 embodiment in order to effect the demodulation of such quarternary QDPSK bursts multiplexed with a video signal, for example. In FIG. 6, parts corresponding to those in FIG. 2 are marked with the same numerals as used in FIG. 2.

A time-division multiplexed signal of combined video and QDPSK signals is applied through input terminal 12 to a QDPSK separator 40 which separates the QDPSK signal from the video signal by differentiating between them on the basis of the difference in modulation and generates a rectangular sampling pulse in response to the separated QDPSK burst.

The sampling pulse is applied to a normally-open switch 41 connected in the circuit between input terminal 12 and synchronous detectors 13, 14 to pass the QDPSK burst to the detectors 13, 14 to derive a control signal from Exclusive-OR gate 29 in a manner similar to FIG. 2. The demodulator includes a loop filter 50. This filter comprises a buffer amplifier 42, a normally-open switch 43 and a resistor 44, all of which are connected in series between the output of Exclusive-OR gate 29 and the input of voltage-controlled oscillator 16. A capacitor 45 is connected between the input of amplifier 42 and ground to form the loop filter with resistor 44. The sampling pulse from QDPSK separator 40 is applied to the switch 43 to charge the capacitor 45 through resistor 44 with the control signal. During the interval between successive bursts, the charging circuit of capacitor 45 is disconnected, enabling it to store the signal. Thus, in the presence of a QDPSK burst, the loop filter is put into filter action to generate a phase control voltage for application to the oscillator 16. In the absence of QDPSK bursts, the filter 50 ceases its filter action and holds the phase control voltage at the input of the oscillator 16 until the next QDPSK burst arrives. As a result, the phase control signal is available during the period when QDPSK bursts are absent. The closed loop operation can therefore be sustained during such periods, while the loop gain may decrease somewhat during such intervals.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A quarternary differential PSK (phase shift keying) demodulator having an input terminal, a pair of output terminals, first and second synchronous detectors each having first and second input terminals and an output terminal, the first input terminals of the synchronous detectors being connected together to said input terminal of the demodulator and the output terminals of the detectors being respectively coupled to said output terminals of the demodulator, a 90-degree phase shifter, a variable frequency oscillator for supplying a carrier to the second input terminal of said first synchronous detector and to the second input terminal of said second synchronous detector through said 90-degree phase shifter, and a loop filter for supplying a phase control signal to said oscillator, the improvement comprising:

a first double-balanced phase detector responsive to the outputs of said first and second synchronous detectors for generating a first phase detector output representative of a product of the outputs of said first and second synchronous detectors;

a second double-balanced phase detector responsive to the output of said second synchronous detector for generating a second phase detector output representative of a square of the output of said second synchronous detector; and means responsive to output signals from said first and second double-balanced phase detectors for supplying an output signal having a frequency four times higher than the frequency of the signals generated by said first and second synchronous detectors to said loop filter.

2. A quarternary differential PSK demodulator as claimed in claim 1, wherein said means responsive to the output signals from said first and second double-balanced phase detectors comprises a third double-balanced phase detector responsive to said first and second phase detector outputs for generating a third phase detector output representative of a product of said first and second phase detector outputs and applying the third phase detector output to said loop filter.

3. A quarternary differential PSK demodulator as claimed in claim 1, wherein the demodulator is adapted to receive a time-division multiplexed signal in which at least one quarternary differential PSK signal is multiplexed with another signal, further comprising:

means for separating said PSK signal from the another signal, applying the separated PSK signal to said first and second synchronous detectors and generating a sampling pulse in response to the separated PSK signal, said loop filter comprising a resistor and switch means connected in a series circuit between said means responsive to output signals and said variable frequency oscillator, and a capacitor connected to said series circuit, said switch means being responsive to said sampling pulse to complete said series circuit for charging said capacitor through said resistor to supply a phase control signal to said variable frequency oscillator and disconnecting the series circuit during the interval between successive PSK bursts to allow said capacitor to retain the phase control signal during said interval.

4. A quarternary differential PSK demodulator as claimed in claim 3, further comprising a buffer amplifier connected between said capacitor and said variable frequency oscillator.

5. A quarternary differential PSK (phase shift keying) demodulator having an input terminal, a pair of output terminals, first and second synchronous detectors each having first and second input terminals and an output terminal, the first input terminals of the synchronous detectors being connected together to said input terminal of the demodulator and the output terminals of the detectors being respectively coupled to said output terminals of the demodulator, a 90-degree phase shifter, a variable frequency oscillator for supplying a carrier to the second input terminal of said first synchronous detector and to the second input terminal of said second synchronous detector through said 90-degree phase shifter, and a loop filter for supplying a phase control signal to said oscillator, the improvement comprising:
- a first double-balanced phase detector having first and second input terminals respectively responsive to signals from said first and second synchronous detectors to generate a first phase detector output representative of a product of the signals supplied to the input terminals of the first double-balanced phase detector;
- a second double-balanced phase detector having a first input terminal responsive to a signal having a polarity opposite to the signal from the second synchronous detector and a second input terminal responsive to the signal from the first synchronous detector to provide a second phase detector output representative of a product of the signals supplied to the input terminals of the second double-balanced phase detector;
- third double-balanced phase detector having first and second input terminals responsive to the signal from said second synchronous detector to provide a third phase detector output representative of a square of the signal from the second synchronous detector;
- fourth double-balanced phase detector having first and second input terminals responsive to the signal from said first synchronous detector to provide a fourth phase detector output representative of a square of the signal from the first synchronous detector;
- a first subtractor responsive to said first and second phase detector outputs for generating a first subtractor output representative of a difference in magnitude between said first and second phase detector outputs;
- a second subtractor responsive to said third and fourth phase detector outputs for generating a second subtractor output representative of a difference in magnitude between said third and fourth phase detector outputs; and
- means responsive to said first and second subtractor outputs for supplying an output signal to said loop filter, said signal having a frequency four times higher than the frequency of the signals generated by said first and second synchronous detectors.

6. A quarternary differential PSK demodulator as claimed in claim 5, wherein said means responsive to said first and second subtractor outputs comprises:
- means for shaping the waveform of said first subtractor outputs into rectangular pulses of a first train;
- means for shaping the waveform of said second subtractor outputs into rectangular pulses of a second train; and
- an Exclusive-OR gate responsive to said first and second trains of said rectangular pulses and supplying output pulses to said loop filter.

7. A quarternary differential PSK demodulator as claimed in claim 5, wherein said means responsive to said first and second subtractor outputs comprises:
- fifth double-balanced phase detector having first and second input terminals responsive to said first and second subtractor outputs respectively for generating a fifth phase detector output representative of a product of said first and second subtractor outputs;
- sixth double-balanced phase detector having a first input terminal responsive to a signal having a polarity opposite to said first subtractor output and a second input terminal responsive to said second subtractor output for generating a sixth phase detector output representative of a product of said signal having opposite polarity and said second subtractor output; and
- a third subtractor responsive to said fifth and sixth phase detector outputs for supplying an output signal representative of a difference in magnitude between said first and sixth phase detector outputs to said loop filter.

8. A quarternary differential PSK demodulator as claimed in claim 5, further comprising a first low-pass filter connected to the output terminal of said first synchronous detector for rejecting carrier components and applying a first filter output to said first, second and fourth double-balanced phase detectors and a second low-pass filter connected to the output terminal of said second synchronous detector for rejecting carrier components and applying a second filter output to said first, second and third double-balanced phase detectors.

9. A quarternary differential PSK demodulator as claimed in claim 5, wherein the demodulator is adapted to receive a time-division multiplexed signal in which at least one quarternary differential PSK signal is multiplexed with another signal, further comprising:
- means for separating said PSK signal from the another signal, applying the separated PSK signal to said first and second synchronous detectors and generating a sampling pulse in response to the separated PSK signal,
- said loop filter comprising a resistor and switch means connected in a series circuit between said means responsive to subtractor outputs and said variable frequency oscillator, and a capacitor connected to said series circuit, said switch means being responsive to said sampling pulse to complete said series circuit for charging said capacitor through said resistor to supply a phase control signal to said variable frequency oscillator and disconnecting the series circuit during the interval between successive PSK bursts to allow said capacitor to retain the phase control signal during said interval.

10. A quarternary differential PSK demodulator as claimed in claim 9, further comprising a buffer amplifier connected between said capacitor and said variable frequency oscillator.

11. A quarternary differential PSK (phase shift keying) demodulator having an input terminal to which is applied a time-division multiplexed signal which multiplexes quarternary differential PSK bursts with another signal, and a pair of output terminals, comprising:

first and second synchronous detectors each having first and second input terminals and an output terminal, the output terminals of the detectors being respectively coupled to said output terminals of the demodulator;

means connected to said input terminal of said demodulator for separating said PSK signal from the another signal, applying the separated PSK signal to said first input terminals of said first and second synchronous detectors and generating a sampling pulse in response to the separated PSK signal;

a first double-balanced phase detector responsive to the outputs of said first and second synchronous detectors for generating a first phase detector output representative of a product of the outputs of said first and second synchronous detectors;

a second double-balanced phase detector responsive to the output of said second synchronous detector for generating a second phase detector output representative of a square of the output of said second synchronous detector;

means responsive to output signals from said first and second double-balanced phase detectors for generating an output signal having a frequency four times higher than the frequency of the signals generated by said first and second synchronous detectors;

a 90-degree phase shifter;

a variable frequency oscillator for supplying a variable frequency carrier to the second input terminal of said first synchronous detector and to the second input terminal of said second synchronous detector through said 90-degree phase shifter; and a loop filter connected to be responsive to said output signal having the four times higher frequency, the loop filter comprising a resistor and switch means connected in a series circuit between said means responsive to output signals and said variable frequency oscillator, and a capacitor connected to said series circuit, said switch means being responsive to said sampling pulse to complete said series circuit for charging said capacitor to supply a phase control signal to said variable frequency oscillator and disconnecting the series circuit during the interval between successive PSK bursts to allow said capacitor to retain the phase control signal during said interval.

12. A quarternary differential PSK (phase shift keying) demodulator having an input terminal to which is applied a time-division multiplexed signal which multiplexes quarternary differential PSK bursts with another signal, and a pair of output terminals, comprising:

first and second synchronous detectors each having first and second input terminals and an output terminal, the output terminals of the detectors being respectively coupled to said output terminals of the demodulator;

means connected to said input terminal of said demodulator for separating said PSK signal from the another signal, applying the separated PSK signal to said first input terminals of said first and second synchronous detectors and generating a sampling pulse in response to the separated PSK signal;

a first double-balanced phase detector having first and second input terminals respectively responsive to signals from said first and second synchronous detectors to generate a first phase detector output representative of a product of the signals supplied to the input terminals of the first double-balanced phase detector;

a second double-balanced phase detector having a first input terminal responsive to a signal having a polarity opposite to the signal from the second synchronous detector and a second input terminal responsive to the signal from the first synchronous detector to provide a second phase detector output representative of a product of the signals supplied to the input terminals of the second double-balanced phase detector;

third double-balanced phase detector having first and second input terminals responsive to the signal from said second synchronous detector to provide a third phase detector output representative of a square of the signal from the second synchronous detector;

fourth double-balanced phase detector having first and second input terminals responsive to the signal from said first synchronous detector to provide a fourth phase detector output representative of a square of the signal from said first synchronous detector;

a first subtractor responsive to said first and second phase detector outputs for generating a first subtractor output representative of a difference in magnitude between said first and second phase detector outputs;

a second subtractor responsive to said third and fourth phase detector outputs for generating a second subtractor output representative of a difference in magnitude between said third and fourth phase detector outputs;

means responsive to said first and second subtractor outputs for supplying an output signal having a frequency four times higher than the frequency of the signals generated by said first and second synchronous detectors;

a 90-degree phase shifter;

a variable frequency oscillator for supplying a variable frequency carrier to the second input terminal of said first synchronous detector and to the second input terminal of said second synchronous detector through said 90-degree phase shifter; and a loop filter connected to be responsive to said output signal having the four times higher frequency, the loop filter comprising a resistor and switch means connected in a series circuit between said means responsive to first and second subtractor outputs and said variable frequency oscillator, and a capacitor connected to said series circuit, said switch means being responsive to said sampling pulse to complete said series circuit for charging said capacitor to supply a phase control signal to said variable frequency oscillator and disconnecting the series circuit during the interval between successive PSK bursts to allow said capacitor to retain the phase control signal during said interval.

* * * * *